United States Patent [19]
Krasner

[11] Patent Number: 6,104,338
[45] Date of Patent: Aug. 15, 2000

[54] METHOD AND APPARATUS FOR OPERATING A SATELLITE POSITIONING SYSTEM RECEIVER

[75] Inventor: Norman F. Krasner, San Carlos, Calif.

[73] Assignee: SnapTrack, Inc., San Jose, Calif.

[21] Appl. No.: 09/072,405

[22] Filed: May 4, 1998

[51] Int. Cl.[7] .............................. G01S 5/02; H04B 7/185
[52] U.S. Cl. ............................. 342/357.06; 342/357.01; 701/213
[58] Field of Search .................. 342/357.01, 357.06, 342/357.07, 357.05; 701/213; 455/12.1

[56] References Cited

U.S. PATENT DOCUMENTS

| | | | |
|---|---|---|---|
| 5,225,842 | 7/1993 | Brown et al. | 342/357 |
| 5,563,607 | 10/1996 | Loomis et al. | 342/357 |
| 5,621,646 | 4/1997 | Enge et al. | 364/449 |
| 5,663,734 | 9/1997 | Krasner | 342/357 |
| 5,702,070 | 12/1997 | Waid | 244/183 |
| 5,786,773 | 7/1998 | Murphy | 340/947 |
| 5,812,087 | 9/1998 | Krasner | 342/357 |

FOREIGN PATENT DOCUMENTS 0508405  10/1992  European Pat. Off. .......... G01S 5/14

*Primary Examiner*—Thomas H. Tarcza
*Assistant Examiner*—Dao L. Phan
*Attorney, Agent, or Firm*—Blakely, Sokoloff, Taylor & Zafman

[57] ABSTRACT

A method and an apparatus for operating a satellite positioning system (SPS) receiver in a client/server architecture. In one example of a method, a first plurality of pseudoranges is determined at a first time and a second plurality of pseudoranges is determined at a second time which is after the first time. The first and the second pluralities of pseudoranges are stored. After the second time, the first and the second pluralities of pseudoranges are transmitted to a location server, normally in one transmission. The location server then determines a first position from the first plurality of pseudoranges and a second position from the second plurality of pseudoranges. In one particular example, the first and second pseudoranges are transmitted in response to a predetermined type of event, and the location server stores a collection of differential GPS data which has been collected over time.

17 Claims, 7 Drawing Sheets

METHOD AND APPARATUS FOR OPERATING A SATELLITE POSITIONING SYSTEM RECEIVER

BACKGROUND OF THE INVENTION

The present invention relates to a method for operating a Satellite Positioning System (SPS) receiver and more particularly relates to a system in which the receiver provides, through a wireless communication link, information regarding its position.

Conventional Satellite Positioning Systems (SPS) such as the Global Positioning System (GPS) use signals from satellites to determine their position. GPS receivers normally determine their position by computing relative times of arrival of signals transmitted simultaneously from a multiplicity of GPS satellites. These satellites transmit, as part of their message, both satellite positioning data as well as data on time of day plus clock timing, which together is herein referred to as ephemeris data. The process of searching for and acquiring GPS signals, reading the ephemeris data for a multiplicity of satellites and computing the location of the receiver from this data is time consuming, often requiring several minutes. In many cases, this lengthy processing time is unacceptable and furthermore greatly limits battery life in portable operations and applications Another current limitation of current GPS receivers is that their operation is limited to situations in which multiple satellites are clearly in view, without obstructions, and where a good quality antenna is properly positioned to receive such signals. As such, they are normally unusable in portable body-mounted applications and in areas where there is significant foliage or building blockage and within buildings.

There are two principal functions of GPS receiving systems: (1) computation of the pseudoranges to the various GPS satellites; and (2) computation of the position of the receiving platform using these pseudoranges and satellite timing and ephemeris data. The pseudoranges are simply the time delays measured between the received signal from each satellite and a local clock in the GPS receiver. The satellite ephemeris and timing data is extracted from the GPS signal once it is acquired and tracked. As stated above, collecting this information normally takes a relatively long time (such as thirty seconds to several minutes) and must be accomplished with a good received signal level in order to achieve low error rates.

Recently, GPS receivers have been used with radio transmitters, such as a cellular telephone or a mobile telephone in a car to transmit the position of the receiver as it moves. Conventional combined GPS/communication systems typically transmit a position from the radio transmitter to a remotely located basestation. Typically, the GPS receiver will determine its position and then provide that information to the transmitter which then transmits the determined position before the GPS receiver has determined a next position. This allows an operator at the remotely located basestation which receives, through the radio signal, the position to track the route of the GPS receiver as it moves over time. In an alternative embodiment, described for example in U.S. Pat. No. 5,663,734, the mobile GPS receiver which includes a communication transmitter transmits time-tagged pseudorange information rather than a completed position calculation (such as latitude, longitude, and altitude of the GPS receiver). In this case, the mobile unit, which includes the GPS receiver, will collect GPS signals and processes those signals to determine pseudoranges to the various satellites in view at a particular time and then the transmitter will transmit these pseudoranges to a remotely located basestation which will then process these pseudoranges with the time tags of the pseudoranges plus ephemeris data collected at or supplied to the basestation in order to determine a position of the mobile unit. Also in this case, the transmitter will transmit one set of pseudoranges before the GPS receiver determines a next set of pseudoranges.

While both of these prior approaches provide a way to track the route of a moving GPS receiver, there are several concerns with using these techniques. In the case of the mobile GPS receiver which determines its position and transmits the position to a remotely located basestation, the mobile unit must have a good view of the sky and receive multiple satellites clearly in order to be able to compute the pseudoranges and to read the ephemeris data before the GPS receiver can determine its position. Furthermore, in the case where this mobile GPS receiver attempts to compute several positions and then transmit them in one transmission, this receiver will typically not be able to benefit from differential GPS corrections, unless a large set of differential corrections is buffered at the basestation. A mobile GPS receiver which collects a series of digitized samples of GPS signals and transmits the series in one transmission will consume large amounts of battery power and may cause congestion in the wireless link due to the large amount of data being collected, stored and transmitted. See, for example, European Patent Application 0 508 405.

In the case of the mobile GPS receiver which transmits pseudoranges one at a time, the communication transmitter must be repeatedly powered up in order to transmit each set of pseudoranges after they have been determined. This may tend to decrease battery life in the mobile unit and may also cause congestion in the wireless communication link between the mobile unit and a basestation. Furthermore, the air time costs may be high for such an operation.

Thus it is desirable to provide an improved method and system for providing multiple sets of position information over a period of time through a mobile GPS unit.

SUMMARY OF THE INVENTION

The present invention provides methods and apparatuses for operating a satellite positioning system receiver so that the position of the receiver can be tracked over time.

In one example of a method according to the present invention, a first plurality of pseudoranges at a first time is determined, and a second (and perhaps additional) plurality of pseudoranges is determined at a second (and perhaps additional) time which is after the first time. The first plurality of pseudoranges and the second plurality of pseudoranges are stored in the satellite positioning system receiver. After the second time, the first plurality of pseudoranges and the second plurality of pseudoranges are transmitted from the mobile SPS receiver.

In one particular example of a method of the present invention, a queue of sets of pseudoranges taken in series over time is stored and then transmitted upon the occurrence of a predetermined type of event from the mobile GPS unit or an alarm condition. The transmission occurs in response to determining that the predetermined type of event has occurred or an alarm condition has occurred. Typically, the GPS receiver will receive first GPS signals from which the first plurality of pseudoranges is determined and will also receive second GPS signals from which the second plurality of pseudoranges is determined. The mobile unit will also determine a first receipt time when the first GPS signals were received at the mobile unit and will also determine a second receipt time when the second GPS signals were received at the mobile unit. These receipt times will be transmitted along with the sets of pseudoranges. A basestation will receive the queue of sets of pseudoranges either in one signal transmission or in a packet-like manner and will use the pseudoranges along with the receipt times of the pseudoranges and along with ephemeris data to determine the position at various times specified by the receipt times of the mobile GPS unit. If the predetermined type of event (or the alarm condition) does not occur, then the pseudorange information may not, in some embodiments, be transmitted at any time. Various other aspects and embodiments of the present invention will be described below.

BRIEF DESCRIPTION OF THE DRAWINGS

The present invention is illustrated by way of example and not limitation in the figures of the accompanying drawings in which like references indicate similar elements.

DETAILED DESCRIPTION

The present invention relates to the use of a satellite positioning system (SPS) receiver to provide position information over time to indicate the movement of the receiver. The following description and drawings are illustrative of the invention and are not to be construed as limiting the invention. Numerous specific details are described to provide a thorough understanding of the present invention. However, in certain instances, well known or conventional details are not described in detail in order to avoid unnecessarily obscuring the present invention.

Figure 1A:
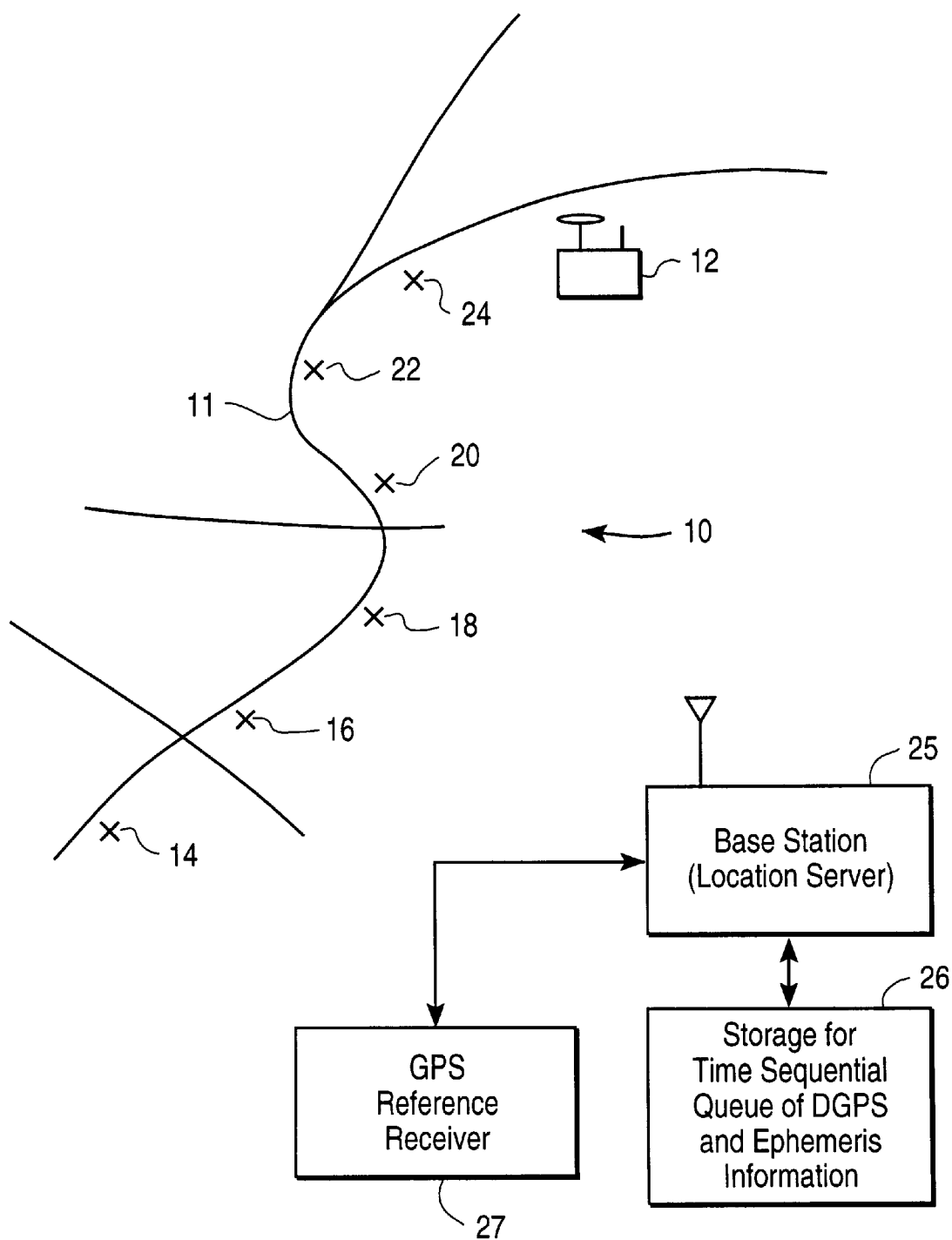
FIG. 1A shows a system for tracking the route of a mobile GPS unit according to one example of the present invention.

FIG. 1 shows an example of a system for tracking the location of a mobile GPS receiver over time as it moves. The mobile GPS receiver 12 is shown on a map at its current location on road 11. Prior locations 14, 16, 18, 20, 22, and 24 are also shown on road 11. In the particular example shown in FIG. 1A, it is assumed that the user of the mobile GPS receiver 12 has driven down the road 11 and began at location 14, passing location 16, 18, 20, 22, and 24 and is now presently at the location shown in FIG. 1A. The mobile GPS receiver 12 includes a GPS receiver, which may be a conventional GPS receiver which can provide an output of pseudoranges to a transmitter which is part of a communication system such as the communication system 78 shown in FIG. 4 which is an example of the mobile GPS receiver 12. Alternatively, the mobile GPS receiver 12 may be similar to the GPS receiver and communication system described in U.S. Pat. No. 5, 663,734. In either embodiment, the mobile GPS receiver 12 will include a memory for storing pseudoranges and a time stamp indicating when the GPS signals were received from which the pseudoranges were determined.

The system of FIG. 1A also includes a location server 25 which communicates through a wireless communication system with the communication system which is coupled to or part of the mobile GPS unit 12. The basestation 25 typically includes storage 26 for storing a time sequence of differential GPS and satellite ephemeris information. The basestation 25 also typically includes a GPS reference receiver 27 which can read satellite ephemeris data from satellites in view and can also provide GPS time and also provide differential GPS information. Thus, the GPS reference receiver 27 may determine differential GPS and satellite ephemeris information and time stamp it with GPS time and the basestation can then store this in the storage 26. This operation is repeatedly performed over time so that there is a queue of ephemeris and differential GPS information for the various satellites in view over a period of time.

In other embodiments, the GPS receiver 27 may be replaced by a remote source of the same type of information that this receiver provides to the basestation server 25. For example, a small network of GPS receivers may be utilized to provide such information to a large number of geographically dispersed basestations, thus reducing the total number of GPS reference receivers required.

Figure 1B:
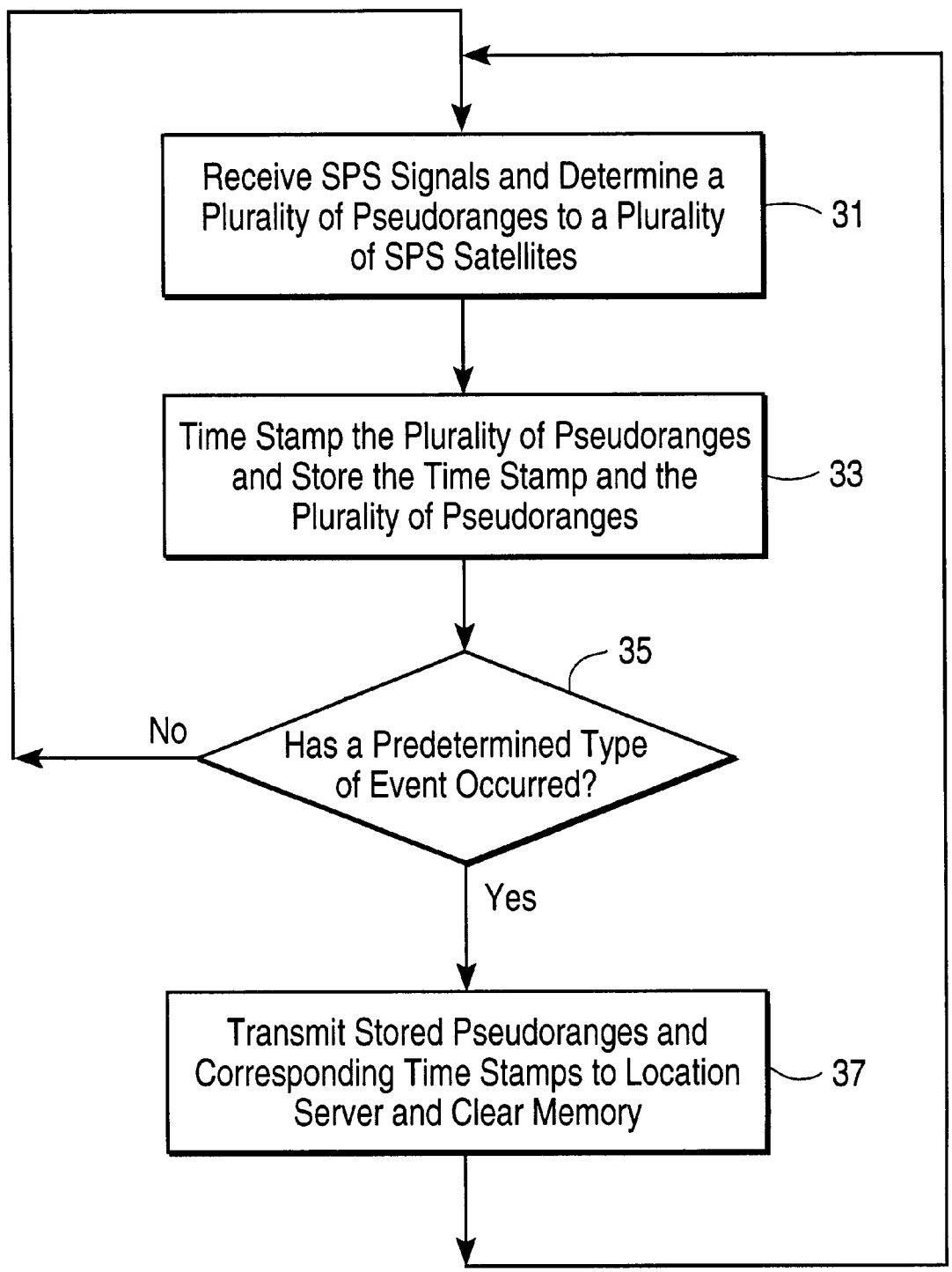
FIG. 1B shows one example of a method performed by the mobile GPS unit in order for a remotely located location server to determine the position at various times of the mobile unit.

FIG. 1B shows an example of a method according to the present invention. This method begins in step 31 in which GPS signals are received by the mobile GPS unit and a plurality of pseudoranges to a plurality of GPS satellites is determined. As explained above, the GPS receiver may be a conventional receiver which utilizes hardware correlation to determine pseudoranges. Alternatively, the pseudoranges may be determined in the manner described in U.S. Pat. No. 5,663,734. As yet another alternative, the GPS signals may be received and digitized and stored along with a time stamp indicating the time in which the signals were received. In this case, these digitized signals, rather than pseudoranges, will be transmitted. This alternative requires larger memory and larger transmission bandwidth in order to store and transmit this considerably larger amount of data. In step 33, the plurality of pseudoranges is time stamped and this plurality of pseudoranges is stored along with the corresponding time stamp. The time stamp may be obtained by reading GPS time from the GPS signals received by the mobile unit or may be obtained in certain instances where the communication system employed for communicating messages between the mobile unit 12 and the basestation 25 utilizes the CDMA cell communication system. The CDMA signals include time as part of the signal and the communication system and the mobile unit 12 can read this time and use it to time stamp the time of receipt of the GPS signals from which the pseudoranges are determined. Another method for determining the time of collection of the GPS signals from which the pseudoranges is determined is described in co-pending U.S. Patent application Ser. No. 08/794,649 which was filed Feb. 3, 1997 by Norman F. Krasner and which is hereby incorporated herein by reference.

In one example of a method according to the present invention, it is determined whether a predetermined type of event has occurred (or an alarm condition has occurred), as shown in step 35. While it will be understood that this step is optional, it will typically be used in order to determine whether or not to transmit the pseudoranges which have been stored along with their corresponding time stamps. If the predetermined type of event has not occurred (or an alarm condition), then processing returns back to step 31 in which additional GPS signals are received and additional pseudoranges are determined. Until the predetermined type of event (or an alarm condition) occurs, processing continues to cycle through steps 31, 33, and 35, thereby collecting a plurality of pseudoranges taken at different times, each with its own time stamp, all of which is stored in memory in the mobile unit 12. An example of this memory is shown as memory 81 in FIG. 4. When the predetermined type event does occur, step 35 proceeds to step 37 in which the stored pseudoranges and the corresponding time stamps are transmitted via a wireless communication system, such as a CDMA cell based communication signal to the location server. Also, as shown in step 37, the memory which stored the pseudoranges and the time stamps is cleared for that portion of the memory. This will permit another set of pseudoranges to be collected along with their corresponding time stamps and stored and later transmitted.

This method provides a number of advantages over the prior art technique of determining a position at each point and then transmitting these positions. It is also advantageous relative to another example in which several positions are determined over time but not transmitted, and then transmitted after a collection of positions is obtained. Attempting to determine the position of the mobile unit will require an adequate view of the sky as well as an adequate ability to read the signals off of enough satellites in order to obtain the satellite ephemeris data. Furthermore, such a method does not allow for the use of differential GPS (DGPS) information which will improve the accuracy of the position calculation (unless the communication link is used to transmit the DGPS data, which will use more power). With the method of the present invention, only the pseudoranges need to be determined by the mobile unit over time. Thus it is not required to be able to read the satellite ephemeris data. With the improved processing techniques described in U.S. Pat. No. 5,663,734, it is possible to obtain pseudoranges to enough satellites in most instances even when the sky is obstructed or the signals are weak. The queuing of pseudoranges and transmission only upon the occurrence of an event minimizes the transmission "air time" yet permits determination upon demand of a history of the mobile's positions.

In the example shown in FIG. 1A, the mobile GPS receiver 12 will receive GPS signals at positions 14, 16, 18, 20, 22, 24, and its current position and will determine pseudoranges from those signals and store those pseudoranges along with the corresponding time stamp in memory. If the predetermined type of event is the collection of the seventh set of signals from which pseudoranges are determined, then the mobile unit 12 will transmit all seven pseudoranges and the corresponding time stamps at the position shown in FIG. 1A for the mobile unit 12. There are numerous other possible predetermined events which could cause the transmission of the sequence of time stamped pseudoranges. One, as already mentioned, is that a certain number of stored pseudoranges has been reached. Another predetermined type of event may be a sensor or alarm which detects an alarm condition or some other condition and which causes the transmission of the stored pseudoranges. One such example is the detection in a car of an accident or the fact that an airbag has inflated or the fact that the car alarm is on. Another predetermined event may be that the basestation asks for the transmission of the stored pseudoranges in order to attempt to locate the current position of the mobile GPS receiver as well as the prior position as indicated in the queue of time stamped pseudoranges. Another predetermined event may be that the memory limit has been reached for storing pseudoranges. Another predetermined event may be that a predetermined period of time has lapsed since the last transmission of pseudoranges. If this time is varied, it may also cause a corresponding variance in the number of saved pseudoranges by varying the interval between which GPS signals are collected and processed to determine pseudoranges. In another example of a predetermined event, it may merely be the user pressing a button on the mobile GPS receiver.

Figure 1C:
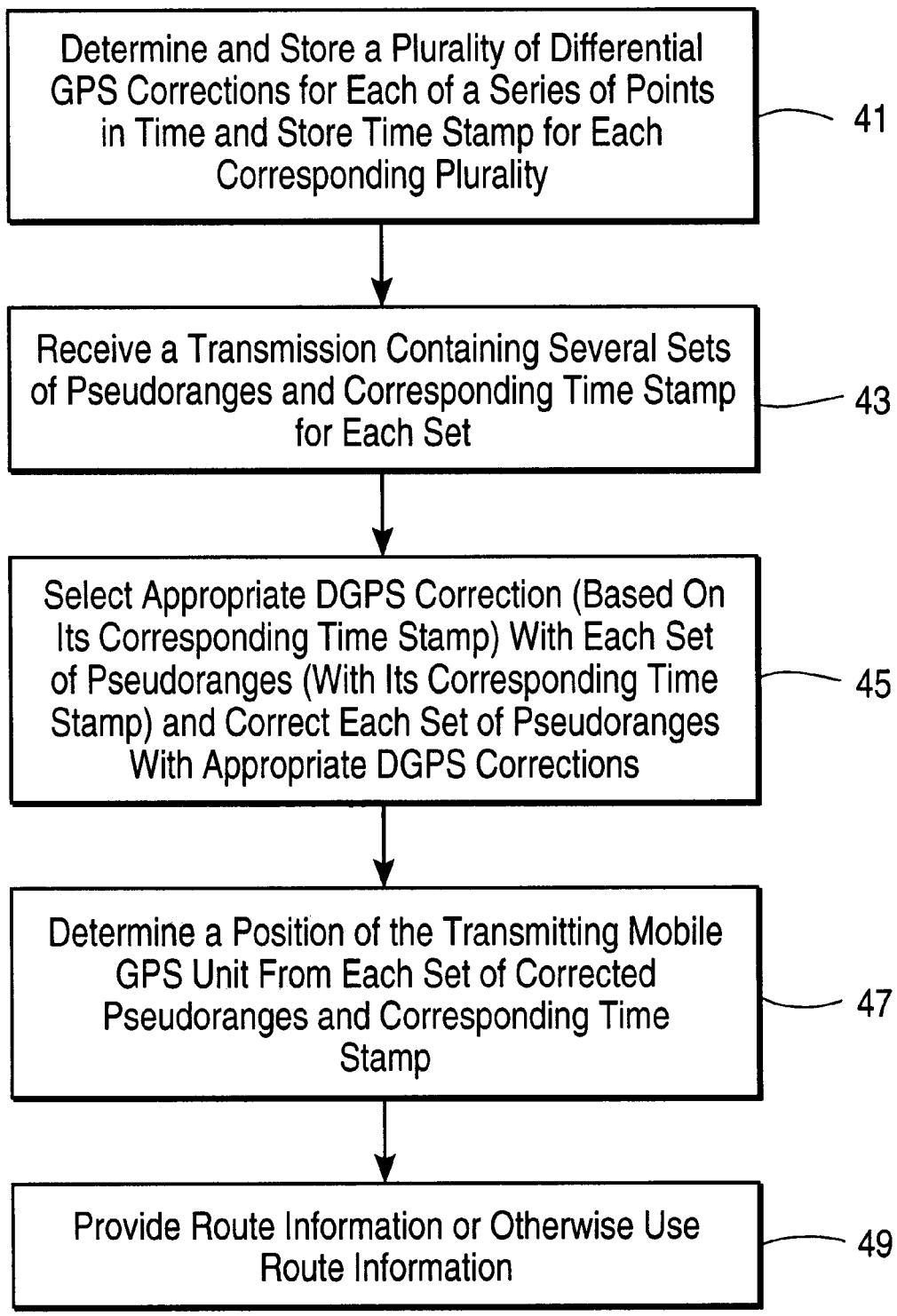
FIG. 1C shows one example of a method in which a location server determines various positions from a queue of sets of pseudoranges taken over time by a mobile unit.

FIG. 1C shows an example of the operations performed according to a method of the present invention on a location server, such as the location server 25. The method of FIG. 1C begins in step 41 in which the location receiver determines and stores a plurality of differential GPS corrections for each of a series of points in time and also stores a time stamp for each corresponding plurality of differential GPS corrections. As described above in the system of FIG. 1A, the location server 25 may receive or determine differential GPS corrections from the GPS reference receiver having a known location. In the case where the basestation and mobile unit use point-to-point radio communications (and not a widely-dispersed cell based system), the GPS reference receiver typically is co-located with the location server and typically also has the same satellites in view as mobile units which are being tracked by the location server 25. The GPS reference receiver 27 may determine differential GPS corrections in the conventional manner and also provide GPS time indicating the point in time when the GPS signals, from which the differential GPS corrections were determined, were received and provide this set of information for each point in time to the location server which causes this information to be stored in storage 26. It will be understood that step 41 will typically occur repeatedly during the overall procedure shown in FIG. 1C. That is, the operation described in step 41 will be repeated and will be occurring continually in order to obtain a queue of differential GPS corrections and the corresponding time stamps for each correction. This will allow differential GPS collections to be made over an extended period of time of travel of a mobile unit, such as the mobile unit 12. For example, if the mobile unit 12 takes one hour to travel from position 14 to its current position past position 24 shown in road 11, then at least one hour of differential GPS corrections may be required. However, if there is a limit in the duration required to determine position history of each mobile, then the queue size of these corrections may be kept small (for example, the queue may correspond to the last one minute period).

It will be appreciated that when a basestation (location server) services a large geographical area, that a reference network of GPS reference receivers providing differential corrections over the entire network may be required. This is further described below. Returning back to FIG. 1C, in step 43, the location server receives a transmission containing several sets of pseudoranges and the corresponding time stamp for each set. It will be appreciated that while the pseudoranges and the time stamps may be transmitted in one transmission, this transmission may be over several packets of data or may be interrupted, although for purposes of the present invention this may still be considered a single transmission of the queue of pseudoranges which have been time stamped. In step 45, the location server selects the most appropriate differential GPS correction to use with each set of pseudoranges by comparing the time stamps for the differential GPS corrections and the time stamps for each set of pseudoranges. In effect, the location server determines the differential GPS correction whose time of applicability is closest in time to the time stamp of the pseudorange. After selecting the appropriate differential GPS correction, the set of pseudoranges are corrected with these differential GPS corrections. It will be appreciated that while the preferred embodiment uses this queue of differential GPS corrections, it is not necessary to practice certain embodiments of the present invention. In step 47, the location server determines a position of the transmitting mobile GPS unit from each set of corrected pseudoranges and the corresponding time stamp. In this manner, the location server can determine that the mobile unit 12 was at position 14 at the time indicated by the time stamp associated with the pseudoranges obtained when the mobile unit was at position 14, and the location server can also determine the positions 16, 18, 20, 22, 24, and its current location and determine the time the mobile unit was at these positions. In this manner, the location server may be able to track the movement of mobile unit in space and in time. This information is used in step 49 in a number of different ways. For example, the basestation may provide concierge services or routing information to the operator of mobile unit 12 by transmitting help information back to the mobile unit 12 through the wireless communication system.

Having a time history of pseudoranges from which a time history of positions are computed allows the server to track the mobile's position and velocity. This is important for locating a mobile in an emergency situation, such as an automobile accident in which the mobile antenna is incapacitated.

While the foregoing description generally assumed a point-to-point communication system between the communication system of the mobile unit 12 and the communication system of the basestation 25, it will be understood that the communication system may be a cell based communication system as described below.

Figure 2:
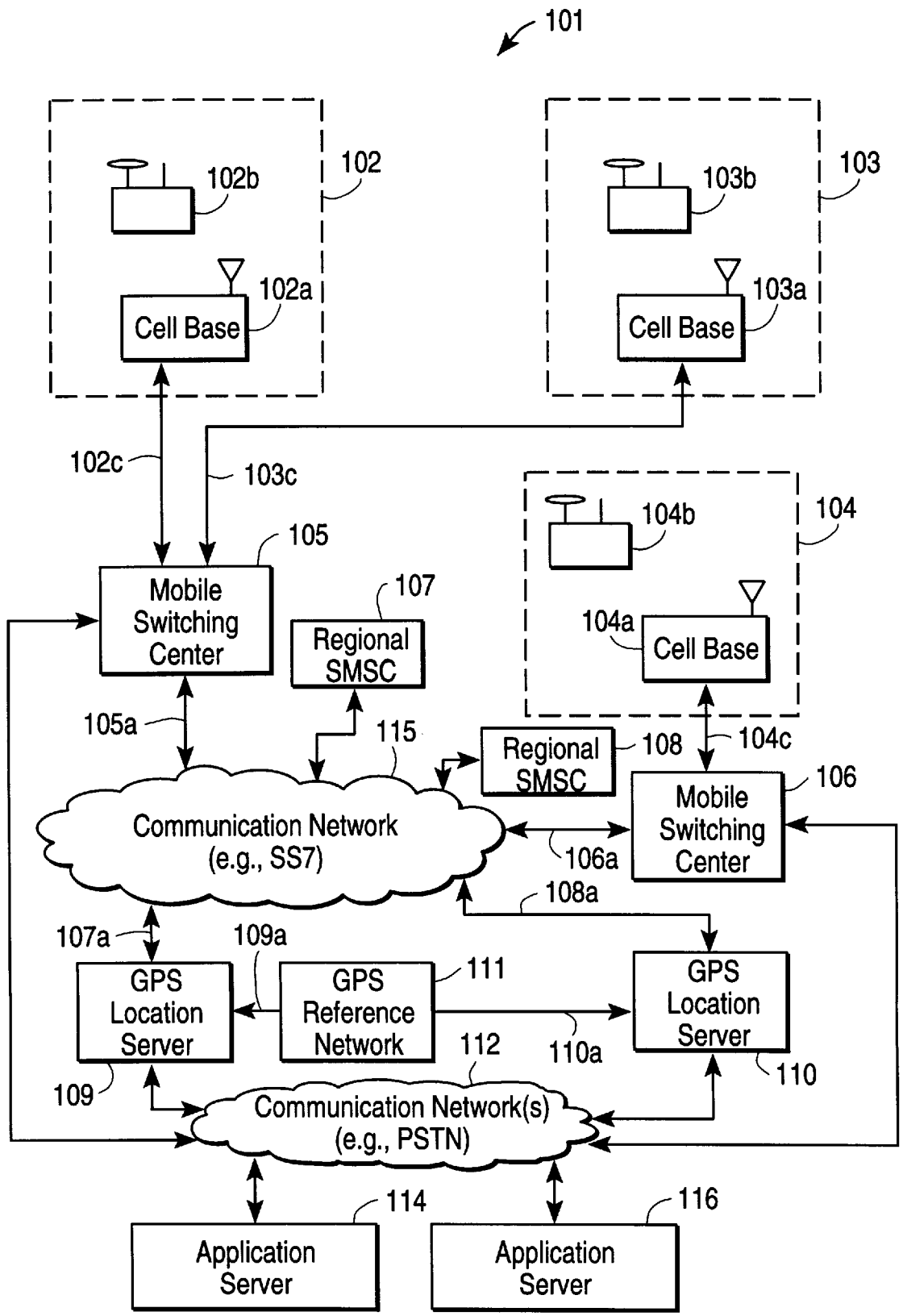
FIG. 2 shows another example of a system for tracking the location of mobile units over time using a cell based communication system.
Figure 4:
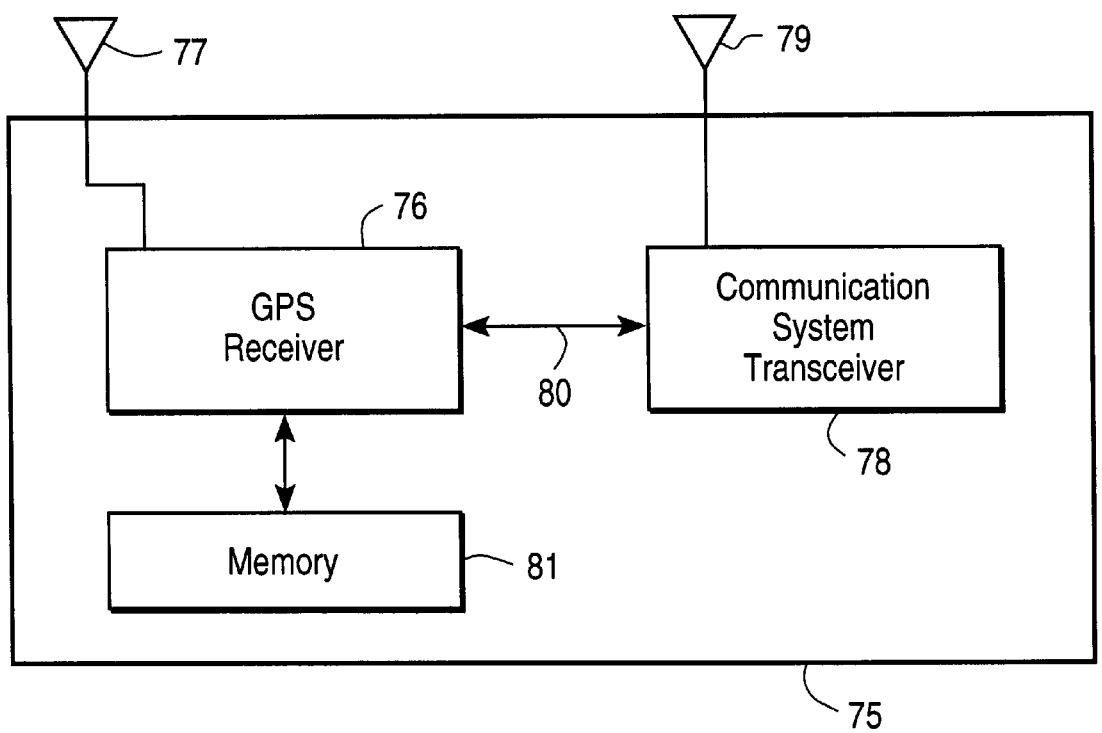
FIG. 4 shows an example of a mobile GPS receiver which is combined with a communication system according to one example of the present invention.

FIG. 2 shows one example of a system 101 of the present invention. The system includes a cell based communication system which includes a plurality of cell sites, each of which is designed to service a particular geographical region or location. Examples of such cellular based or cell based communication systems are well known in the art, such as the cell based telephone systems. It will be appreciated that FIG. 2 has not been drawn to show an overlap of cells. However, the signal coverage zone of the cells may in fact overlap. The cell based communication system as shown in FIG. 1 includes three cells 102, 103, and 104. It will be appreciated that a plurality of cells with corresponding cell sites and/or cellular service areas may also be included in the system 101 and be coupled to one or more cell based switching centers, such as the mobile switching center 105 and the mobile switching center 106. Within each cell, such as the cell 102, there is a wireless cell basestation (sometimes referred to as a cell site) such as the cell basestation 102a which is designed to communicate through a wireless communication medium using cell based communication signals with a communication system, which typically includes a receiver and a transmitter for communicating by using the cell based communication signals and a mobile GPS receiver. This combined communication system and mobile GPS receiver provides a combined system such as the receiver 102b shown in FIG. 2. An example of such a combined system having a GPS receiver and a communication system is shown in FIG. 4 and may include both the GPS antenna 77 and a communication system antenna system 79. Each cell site is coupled typically to a mobile switching center. In FIG. 2, cell bases 102a and 103a are coupled to switching center 105 through connections 102c and 103c, respectively, and cell base 104a is coupled to a different mobile switching center 106 through connection 104c. These connections are typically wireline connections between the respective cell base and the mobile switching centers 105 and 106. Each cell base includes an antenna for communicating with communication systems serviced by the particular cell site/base. In one example, the cell site may be a cellular telephone cell site which communicates with mobile cellular telephones (integrated with a GPS receiver) in the area serviced by the cell site.

In a typical embodiment of the present invention, the mobile GPS receiver, such as receiver 102b, includes a cell based communication system which is integrated with the GPS receiver such that both the GPS receiver and the communication system are enclosed in the same housing. One example of this is a cellular telephone having an integrated GPS receiver which shares common circuitry with the cellular telephone transceiver. When this combined system is used for cellular telephone communications, transmissions occur between the receiver 102b and the cell base 102a. Transmissions from the receiver 102b to the cell base 102a are then propagated over the connection 102c to the mobile switching center 105 and then to either another cellular telephone in a cell serviced by the mobile switching center 105 or through a connection (typically wired) to another telephone through the land-based telephone system/network 112. It will be appreciated that the term wired includes fiber optic and other non wireless connections such as copper cabling, etc. Transmissions from the other telephone which is communicating with the receiver 102a are conveyed from the mobile switching center 105 through the connection 102c and the cell base 102a back to the receiver 102b in the conventional manner.

In the example of FIG. 2, each mobile switching center (MSC) is coupled to at least one regional short message service center (SMSC) through a communication network 115 which in one embodiment is referred to as a Signaling System Number 7 (SS7) Network. This network is designed to allow short messages (e.g. control information and data) to be passed among elements of the telephone network. It will be understood that FIG. 2 shows one example and that it is possible for several MSC's to be coupled to one regional SMSC. The network 115 interconnects MSC's 105 and 106 to regional SMSC's 107 and 108. The example of FIG. 2 also shows two GPS location servers 109 and 110 which are coupled to regional SMSC 107 and regional SMSC 108 through the network 115. In one embodiment of the distributed system of FIG. 2, the network 115 may be a permanent packet switched data network which interconnects various regional SMSC's and MSC's with various GPS location servers. This allows each regional SMSC to act as a router to route requests for location services to whichever GPS location servers are available in case of congestion at a location server or failure of a location server. Thus, regional SMSC 107 may route location service requests from mobile GPS receiver 102b (e.g. the user of mobile GPS receiver 102b dials 911 on the integrated cell telephone) to the GPS location server 110 if location server 109 is congested or has failed or is otherwise unable to service the location service request.

Each GPS location server is typically coupled to a wide area network of GPS reference stations which provide differential GPS corrections and satellite ephemeris data to the GPS location servers. This wide area network of GPS reference stations, shown as GPS reference network 111, is typically coupled to each GPS location server through a dedicated packet switched data network. Hence, location server 109 receives data from the network 111 through connection 109a and server 110 receives data from network 111 through connection 110a. The reference network 111 may be coupled to the communication network 112. Alternatively, a GPS reference receiver may be used at each location server to provide satellite ephemeris and GPS time to the GPS location server. As shown in FIG. 2, each GPS location server is also coupled to a communication network such as a public switched telephone network (PSTN) 112 to which two application servers 114 and 116 are coupled.

The two GPS location servers are, in one embodiment, used to determine the position of a mobile GPS receiver (e.g. receiver 102b) using GPS signals received by the mobile GPS receiver.

Each GPS location server will receive pseudoranges from a mobile GPS receiver and satellite ephemeris data from the GPS reference network and calculate a route of positions for the mobile GPS receiver and then these positions will be transmitted through the network 112 (e.g. the public switched telephone network PSTN) to one (or both) of the Application Servers where the positions are presented (e.g. displayed on a map) to a user at the Application Server. Normally, the GPS location server calculates but does not present (e.g. by display) the positions at the GPS location server. An application server may send a request, for the positions of a particular GPS receiver in one of the cells, to a GPS location server which then initiates a conversation with a particular mobile GPS receiver through the mobile switching center in order to determine the route of positions of the GPS receiver and report those positions back to the particular application. In another embodiment, a position determination for a GPS receiver may be initiated by a user of a mobile GPS receiver; for example, the user of the mobile GPS receiver may press 911 on the cell phone to indicate an emergency situation at the location of the mobile GPS receiver and this may initiate a location process in the manner described herein.

It should be noted that a cellular based or cell based communication system is a communication system which has more than one transmitter, each of which serves a different geographical area, which is predefined at any instant in time. Typically, each transmitter is a wireless transmitter which serves a cell which has a geographical radius of less than 20 miles, although the area covered depends on the particular cellular system. There are numerous types of cellular communication systems, such as cellular telephones, PCS (personal communication system), SMR (specialized mobile radio), one-way and two-way pager systems, RAM, ARDIS, and wireless packet data systems. Typically, the predefined geographical areas are referred to as cells and a plurality of cells are grouped together into a cellular service area and these pluralities of cells are coupled to one or more cellular switching centers which provide connections to land-based telephone systems and/or networks. A service area is often used for billing purposes. Hence, it may be the case that cells in more than one service area are connected to one switching center. Alternatively, it is sometimes the case that cells within one service area are connected to different switching centers, especially in dense population areas. In general, a service area is defined as a collection of cells within close geographical proximity to one another. Another class of cellular systems that fits the above description is satellite based, where the cellular basestations or cell sites are satellites that typically orbit the earth. In these systems, the cell sectors and service areas may be very large and move as a function of time. Examples of such systems include Iridium, Globalstar, Orbcomm, and Odyssey.

Figure 3:
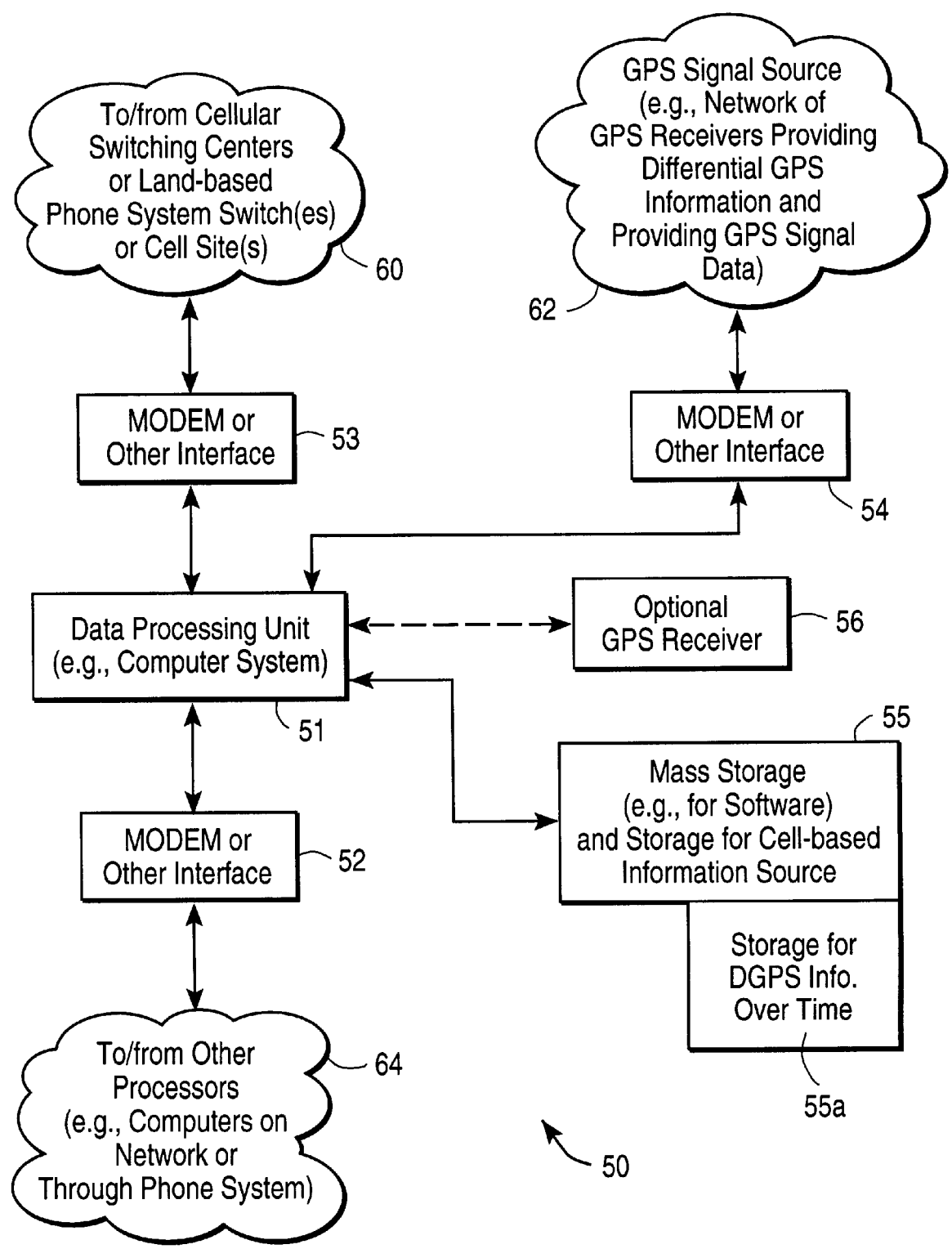
FIG. 3 shows an example of a location server which may be used with a cellular based communication system in one example of the present invention.

FIG. 3 shows an example of a GPS location server 50 which may be used as the GPS server 109 or GPS server 110 in FIG. 2. The GPS server 50 of FIG. 3 includes a data processing unit 51 which may be a fault-tolerant digital computer system. The SPS server 50 also includes a modem or other communication interface 52 and a modem or other communication interface 53 and a modem or other communication interface 54. These communication interfaces provide connectivity for the exchange of information to and from the location server shown in FIG. 3 between three different networks, which are shown as networks 60, 62, and 64. The network 60 includes the mobile switching center or centers and/or the land-based phone system switches or the cell sites. An example of this network is shown in FIG. 2 wherein the GPS server 109 represents the server 50 of FIG. 3. Thus the network 60 may be considered to include the mobile switching centers 105 and 106 and the cells 102, 103, and 104. The network 64 may be considered to include the Applications Servers 114 and 116, which are each usually computer systems with communication interfaces, and also may include one or more "PSAP's," (Public Safety Answering Point) which is typically the control center which answers 911 emergency telephone calls. The network 62, which represents the GPS reference network 111 of FIG. 2, is a network of GPS receivers which are GPS reference receivers designed to provide differential GPS correction information and also to provide GPS signal data including the satellite ephemeris data to the data processing unit. When the server 50 serves a very large geographical area, a local optional GPS receiver, such as optional GPS receiver 56, may not be able to observe all GPS satellites that are in view of mobile SPS receivers throughout this area. Accordingly, the network 62 collects and provides satellite ephemeris data and differential GPS correction data over a wide area in accordance with the present invention.

As shown in FIG. 3, a mass storage device 55 is coupled to the data processing unit 51. Typically, the mass storage 55 will include storage for data and software for performing the GPS position calculations after receiving pseudoranges from the mobile GPS receivers, such as a receiver 102b of FIG. 2. These pseudoranges are normally received through the cell site and mobile switching center and the modem or other interface 53. The mass storage device 55 also includes software, at least in one embodiment, which is used to receive and use the satellite ephemeris data provided by the GPS reference network 32 through the modem or other interface 54. The mass storage device 55 also will typically include a database or storage 55a which specifies a queue of time stamped satellite ephemeris and differential GPS corrections as described above.

In a typical embodiment of the present invention, the optional GPS receiver 56 is not necessary as the GPS reference network 111 of FIG. 2 (shown as network 62 of FIG. 3) provides the differential GPS information and corresponding time stamps as well as providing the raw satellite data messages from the satellites in view of the various reference receivers in the GPS reference network. It will be appreciated that the satellite ephemeris data obtained from the network through the modem or other interface 54 may be used in a conventional manner with the pseudoranges obtained from the mobile GPS receiver in order to compute the position information for the mobile GPS receiver. The interfaces 52, 53, and 54 may each be a modem or other suitable communication interface for coupling the data processing unit to other computer systems in the case of network 64 and to cellular based communication systems in the case of network 60 and to transmitting devices, such as computer systems in the network 62. In one embodiment, it will be appreciated that the network 62 includes a dispersed collection of GPS reference receivers dispersed over a geographical region. In some embodiments, the differential correction GPS information, obtained from a receiver near the cell site or cellular service area which is communicating with the mobile GPS receiver through the cellular based communication system, will provide differential GPS correction information which is appropriate for the approximate location of the mobile GPS receiver.

FIG. 4 shows a generalized combined system which includes a GPS receiver and a communication system transceiver. In one example, the communication system transceiver is a cellular telephone. The system 75 includes a GPS receiver 76 having a GPS antenna 77 and a communication transceiver 78 having a communication antenna 79. The GPS receiver 76 is coupled to the communication transceiver 78 through the connection 80 shown in FIG. 4. The memory 81 stores a queue of determined pseudoranges and corresponding time stamps as described above. This memory 81 is coupled to the GPS receiver 76 and may also be coupled to the communication transceiver (e.g. the memory is dual ported). In one mode of operation, the communication system transceiver 78 receives approximate Doppler information through the antenna 79 and provides this approximate Doppler information over the link 80 to the GPS receiver 76 which performs the pseudorange determination by receiving the GPS signals from the GPS satellites through the GPS antenna 77. The determined pseudoranges are then transmitted to a GPS location server through the communication system transceiver 78. Typically the communication system transceiver 78 sends a signal through the antenna 79 to a cell site which then transfers this information back to the GPS location server. Examples of various embodiments for the system 75 are known in the art. For example, U.S. Pat. No. 5,663,734 describes an example of a combined GPS receiver and communication system which utilizes an improved GPS receiver system. Another example of a combined GPS and communication system has been described in copending application Ser. No. 08/652,833, which was filed May 23, 1996. Most conventional GPS receivers can be modified to work as the receiver 76 in FIG. 4, although receivers, such as those described in U.S. Pat. No. 5,663,734 may provide improved performance. The system 75 of FIG. 4, as well as numerous alternative communication systems having SPS receivers will typically time stamp the time of the receipt of GPS signals from which pseudoranges are determined. In particular, the system 75 may use GPS time (received or estimated from the GPS satellites) or use time from CDMA transmissions (in a preferred embodiment) to time stamp the time of receipt at the mobile unit of SPS signals.

Figure 5:
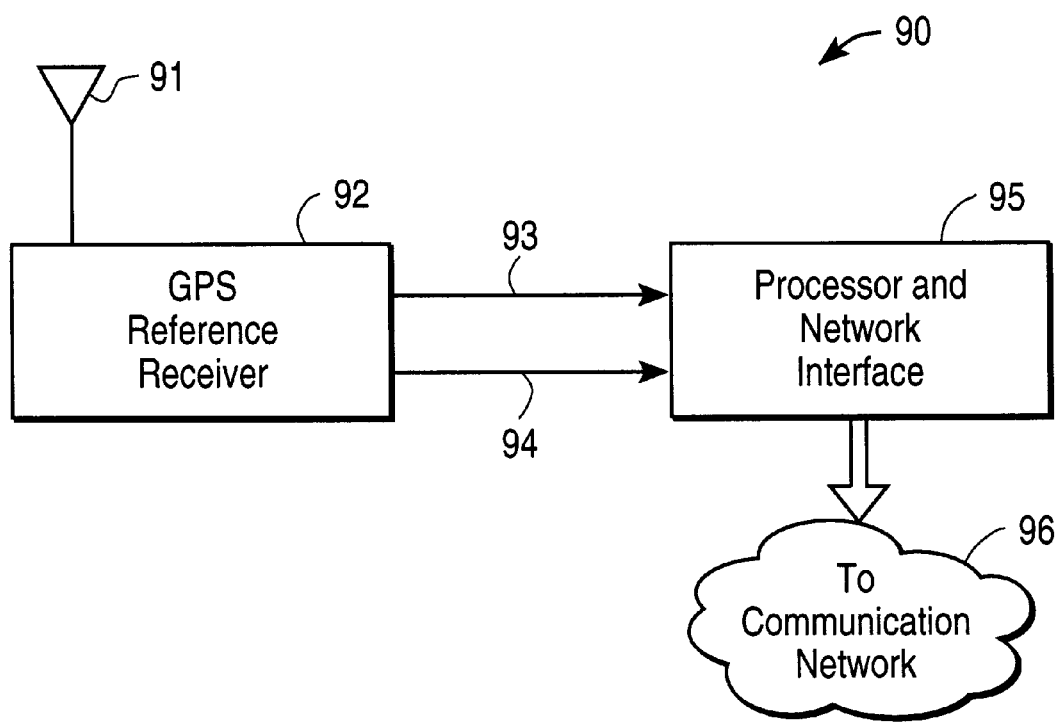
FIG. 5 shows an example of a GPS reference station which may be used with one example of the present invention.

FIG. 5 shows one embodiment for a GPS reference station. It will be appreciated that each reference station may be constructed in this way and coupled to the communication network or medium. Typically, each GPS reference station, such as GPS reference station 90 of FIG. 5, will include a dual frequency GPS reference receiver 92 which is coupled to a GPS antenna 91 which receives GPS signals from GPS satellites in view of the antenna 91. GPS reference receivers are well known in the art. The GPS reference receiver 92, according to one embodiment of the present invention, provides at least two types of information as outputs from the receiver 92. Pseudorange outputs 93 are provided to a processor and network interface 95, and these pseudorange outputs (and the time at which the SPS signals, from which the reference pseudoranges were determined, were received) are used to compute pseudorange differential corrections in the conventional manner for those satellites in view of the GPS antenna 91. The processor and network interface 95 may be a conventional digital computer system which has interfaces for receiving data from a GPS reference receiver as is well known in the art. The processor 95 will typically include software designed to process the pseudorange data to determine the appropriate pseudorange correction for each satellite in view of the GPS antenna 91. These pseudorange corrections (and their corresponding time stamps) are then transmitted through the network interface to the communication network or medium 96 to which other GPS reference stations are also coupled. The GPS reference receiver 92 also provides a satellite ephemeris data output 94. This data is provided to the processor and network interface 95 which then transmits this data onto the communication network 96, which is included in the GPS reference network 111 of FIG. 2.

The satellite ephemeris data output 94 provides typically at least part of the entire raw 50 baud navigation binary data encoded in the actual GPS signals received from each GPS satellite. This satellite ephemeris data is part of the navigation message which is broadcast as the 50 bit per second data stream in the GPS signals from the GPS satellites and is described in great detail in the GPS ICD-200 document. The processor and network interface 95 receives this satellite ephemeris data output 94 and transmits it in real time or near real time to the communication network 96. As will be described below, this satellite ephemeris data which is transmitted into the communication network is later received through the network at various GPS location servers according to aspects of the present invention.

In certain embodiments of the present invention, only certain segments of the navigation message, such as the satellite ephemeris data message may be sent to location servers in order to lower the bandwidth requirements for the network interfaces and for the communication network. Typically, also, this data may not need to be provided continuously. For example, only the first three frames which contain ephemeris information rather than all 5 frames together may be transmitted on a regular basis into the communication network 96 in real time or near real time. It will be appreciated that in one embodiment of the present invention, the location server may receive the entire navigation message which is transmitted from one or more GPS reference receivers in order to perform a method for measuring time related to satellite data messages, such as the method described in co-pending U.S. patent application Ser. No. 08/794,649, which was filed Feb. 3, 1997, by Norman F. Krasner. As used herein, the term "satellite ephemeris data" includes data which is only a portion of the satellite navigation message (e.g. 50 baud message) transmitted by a GPS satellite or at least a mathematical representation of this satellite ephemeris data. For example, the term satellite ephemeris data refers to a portion of the 50 baud data message encoded into the GPS signal transmitted from a GPS satellite. It will be also understood that the GPS reference receiver 92 decodes the different GPS signals from the different GPS satellites in view of the reference receiver 92 in order to provide the binary data output 94 which contains the satellite ephemeris data.

When a method of the present invention is used to track a route over time of a mobile unit which the cell based system of FIG. 2, one location server may track the movement of a particular mobile unit from one cell to several other cells. Due to the interconnectivity of such a system, even receipt of signals from a mobile unit which began in cell 102 may be tracked by the same location server even after the mobile unit has moved to cell 104. Alternatively, one location server may transfer its route data indicating the positions and times which have been determined for a particular mobile unit to another location server which takes over tracking of the mobile unit as it moves from one cell site or cellular service center to another cell site or cellular service center.

Although the methods and apparatus of the present invention have been described with reference to GPS satellites, it will be appreciated that the teachings are equally applicable to positioning systems which utilize pseudolites or a combination of satellites and pseudolites. Pseudolites are ground based transmitters which broadcast a PN code (similar to a GPS signal) modulated on an L-band carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings or other enclosed areas. The term "satellite", as used herein, is intended to include pseudolite or equivalents of pseudolites, and the term GPS signals, as used herein, is intended to include GPS-like signals from pseudolites or equivalents of pseudolites.

In the preceding discussion the invention has been described with reference to application upon the United States Global Positioning Satellite (GPS) system. It should evident, however, that these methods are equally applicable to similar satellite positioning systems, and in, particular, the Russian Glonass system. The Glonass system primarily differs from GPS system in that the emissions from different satellites are differentiated from one another by utilizing slightly different carrier frequencies, rather than utilizing different pseudorandom codes. In this situation substantially all the circuitry and algorithms described previously are applicable with the exception that when processing a new satellite's emission a different exponential multiplier corresponding to the different carrier frequencies is used to preprocess the data. The term "GPS" used herein includes such alternative satellite positioning systems, including the Russian Glonass system.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for operating a mobile satellite positioning system (SPS) receiver, said method comprising:
   determining a first plurality of pseudoranges at a first time;
   determining a second plurality of pseudoranges at a second time which is after said first time;
   storing said first plurality of pseudoranges and storing said second plurality of pseudoranges;
   transmitting after said second time said first plurality of pseudoranges and said second plurality of pseudoranges.

2. A method as in claim 1 further comprising determining whether a predetermined type of event has occurred and transmitting said first plurality of pseudoranges and said second plurality of pseudoranges in response to determining that said predetermined type of event has occurred.

3. A method as in claim 2 wherein said predetermined type of event is one of: (a) a sensor detects a condition; or (b) a memory limit is reached; or (c) a predetermined number of pluralities of pseudoranges has been stored; or (d) a predetermined period of time has lapsed since a last set of pseudoranges was transmitted; or (e) a command from an external source has been received over a communication link.

4. A method as in claim 1 further comprising:
   receiving in said SPS receiver first SPS signals from which said first plurality of pseudoranges is determined;
   determining a first receipt time when said first SPS signals were received at said SPS receiver;
   receiving in said SPS receiver second SPS signals from which said second plurality of pseudoranges is determined;
   determining a second receipt time when said second SPS signals were received at said SPS receiver;
   transmitting said first receipt time and said second receipt time.

5. A method as in claim 4 further comprising:
   determining whether a predetermined type of event has occurred and transmitting said first plurality of pseudoranges and said second plurality of pseudoranges and said first receipt time and said second receipt time in response to determining that said predetermined type of event has occurred.

6. A method as in claim 5 wherein said predetermined type of event comprises a predetermined period of time which has lapsed since a last set of pseudoranges was transmitted.

7. A method as in claim 6 wherein said predetermined period of time can be varied.

8. A method as in claim 7 wherein varying said predetermined period of time causes an interval of time between said first plurality of pseudoranges and said second plurality of pseudoranges to be varied.

9. A method as in claim 4 wherein said first plurality of pseudoranges and said second plurality of pseudoranges are part of a series of pluralities of pseudoranges which are determined and stored sequentially over time and then transmitted as a collection of data.

10. A mobile Satellite Positioning System (SPS) receiver comprising:
    a SPS RF (radio frequency) receiver which receives SPS signals;
    a processor coupled to said SPS RF receiver, said processor determining a plurality of pseudoranges from said SPS signals, wherein said processor determines a first plurality of pseudoranges from SPS signals received at a first time and determines a second plurality of pseudoranges from SPS signals received at a second time which is after said first time;
    a memory coupled to said processor, said memory storing said first plurality of pseudoranges and said second plurality of pseudoranges;
    a transmitter coupled to said memory, said transmitter transmitting said first plurality of pseudoranges and said second plurality of pseudoranges after said second time.

11. A SPS receiver as in claim 10 wherein said transmitter transmits said first plurality of pseudoranges and said second plurality of pseudoranges in response to a predetermined type of event.

12. A SPS receiver as in claim 11 wherein said SPS RF receiver receives first SPS signals from which said first plurality of pseudoranges is determined and said SPS RF receiver receives second SPS signals from which said second plurality of pseudoranges is determined and wherein a first receipt time when said first SPS signals were received is determined and stored in said memory and a second receipt time when said second SPS signals were received is determined and stored in said memory and wherein said transmitter transmits said first receipt time and said second receipt time.

13. A SPS receiver as in claim 12 wherein said first receipt time and said second receipt time are determined from SPS signals.

14. A SPS receiver as in claim 12 wherein said first receipt time and said second receipt time are determined from time signals received in a cell based communication signal which is received by a communication receiver which is coupled to said processor.

15. A method of determining position from satellite positioning system (SPS) information, said method comprising:

receiving a first plurality of pseudoranges which were determined from first SPS signals received at a first time;

receiving a second plurality of pseudoranges which were determined from second SPS signals received at a second time which is after said first time;

determining a first position from said first plurality of pseudoranges and determining a second position from said second plurality of pseudoranges, wherein said first plurality of pseudoranges and said second plurality of pseudoranges were received in one transmission after said second time.

16. A method as in claim 15 wherein said one transmission occurs after a predetermined type of event.

17. A method as in claim 15 further comprising:

storing a first plurality of pseudorange corrections for a corresponding first correction time and storing a second plurality of pseudorange corrections for a corresponding second correction time;

determining said first position also from said first plurality of pseudorange corrections and determining said second position also from said second plurality of pseudorange corrections.

* * * * *